United States Patent
Hoffman et al.

(10) Patent No.: US 7,062,523 B1
(45) Date of Patent: Jun. 13, 2006

(54) METHOD FOR EFFICIENTLY COMPUTING A FAST FOURIER TRANSFORM

(75) Inventors: Marc Hoffman, Mansfield, MA (US); Jose Fridman, Brookline, MA (US)

(73) Assignee: Analog Devices, Inc., Norwood, MA (US)

( * ) Notice: Subject to any disclaimer, the term of this patent is extended or adjusted under 35 U.S.C. 154(b) by 663 days.

(21) Appl. No.: 09/630,258

(22) Filed: Aug. 1, 2000

(51) Int. Cl.
G06F 15/00 (2006.01)

(52) U.S. Cl. .................................. 708/404; 708/403

(58) Field of Classification Search ........ 708/400–409, 708/523
See application file for complete search history.

(56) References Cited

U.S. PATENT DOCUMENTS

| | | | | |
|---|---|---|---|---|
| 4,899,301 A | * | 2/1990 | Nishitani et al. | 708/404 |
| 5,430,888 A | * | 7/1995 | Witek et al. | 711/205 |
| 5,694,347 A | * | 12/1997 | Ireland | 708/404 |
| 5,941,940 A | * | 8/1999 | Prasad et al. | 708/523 |
| 5,951,627 A | * | 9/1999 | Kiamilev et al. | 708/404 |
| 6,098,088 A | * | 8/2000 | He et al. | 708/406 |
| 6,115,728 A | * | 9/2000 | Nakai et al. | 708/404 |
| 6,182,103 B1 | * | 1/2001 | Zierhofer | 708/319 |
| 6,263,356 B1 | * | 7/2001 | Kozaki et al. | 708/400 |
| 6,356,926 B1 | * | 3/2002 | Andre | 708/404 |
| 6,421,696 B1 | * | 7/2002 | Horton | 708/404 |
| 6,430,587 B1 | * | 8/2002 | Orling | 708/404 |
| 6,609,140 B1 | * | 8/2003 | Greene | 708/404 |

\* cited by examiner

*Primary Examiner*—Todd Ingberg
*Assistant Examiner*—Chat C. Do
(74) *Attorney, Agent, or Firm*—Weingarten, Schurgin, Gagnebin & Lebovici LLP

(57) ABSTRACT

A method for computing an out of place FFT in which each stage of the FFT has an identical signal flow geometry. In each stage of the presently disclosed FFT method the group loop has been eliminated, the twiddle factor data is stored in bit-reversed manner, and the output data values are stored with a unity stride.

9 Claims, 5 Drawing Sheets

| Input Order | Twiddle Factors | Bit-Reversed Order | Twiddle Factors |
|---|---|---|---|
| 0 0 0 | $W_8^0$ | 0 0 0 | $W_8^0$ |
| 0 0 1 | $W_8^1$ | 1 0 0 | $W_8^4$ |
| 0 1 0 | $W_8^2$ | 0 1 0 | $W_8^2$ |
| 0 1 1 | $W_8^3$ | 1 1 0 | $W_8^6$ |
| 1 0 0 | $W_8^4$ | 0 0 1 | $W_8^1$ |
| 1 0 1 | $W_8^5$ | 1 0 1 | $W_8^5$ |
| 1 1 0 | $W_8^6$ | 0 1 1 | $W_8^3$ |
| 1 1 1 | $W_8^7$ | 1 1 1 | $W_8^7$ |

*Fig. 7*

METHOD FOR EFFICIENTLY COMPUTING A FAST FOURIER TRANSFORM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates generally to a technique for computing a Fast Fourier Transform (FFT) and more particularly to methods and apparatus for computing an FFT in which the number of loop operations are reduced and the resultant output data values from each stage data are stored in a memory with a unity stride.

The fast Fourier transform (FFT) is the generic name for a class of computationally efficient algorithms that implement the discrete Fourier transforms (DFT), and are widely used in the field of digital signal processing.

A band-limited time-varying analog signal can be converted into a series of discrete digital signals by sampling the analog signal at or above the Nyquist frequency, to avoid aliasing, and digitizing the sampled analog signals. A DFT algorithm may be applied to these digitized samples to calculate the discrete frequency components contained within the analog signal. The DFT algorithm provides, as output data values, the magnitude and phase of the discrete frequency components of the analog signal. These discrete frequency components are evenly spaced between 0 and ½ the sampling frequency, which is typically the Nyquist sampling frequency. The number of discrete frequency components is equal to the number of the digitized samples that are used as input data. For example, a DFT having 8 input samples, will have 8 evenly spaced frequency components as output.

The DFT is given by:

$$X(k) = \frac{1}{N}\sum_{n=0}^{N-1} x(n)e^{j\frac{2\pi nk}{N}}$$

where:
  N is the number of input samples;
  n is the particular index in the time domain sample from n=0 to n=N−1;
  x(n) is the magnitude of the time domain analog signal at the time sample point corresponding to n;
  k is the particular frequency domain component from k=0 to k=N−1; and
  X(k) is the magnitude of the frequency component corresponding to the frequency index k.

The DFT involves a large number of calculations and memory operations and, as such, is not computationally efficient. The FFT algorithm reduces the computational load of calculating the discrete frequency components in a time domain signal from approximately $6(N^2)$ to approximately $N\log_2 N$. As will be discussed in detail below, this reduction in the number of calculations is achieved by decomposing the standard DFT algorithm into a series of smaller and smaller DFTs. For example, an 8 point DFT can be decomposed into an FFT involving 3 stages of calculations. In this manner the 8 point FFT is decomposed into one 8 point FFT that can be decomposed into two 4 point DFTs that are decomposed into four 2 point DFTs.

At each stage of the FFT algorithm the canonical mathematical operations performed on each pair of input data is known as the FFT butterfly operation. FIG. 4 illustrates the canonical FFT butterfly operations which are $$X(m+1)=X(m)+W(n,k)Y(m)$$

$$Y(m+1)=X(m)-W(n,k)Y(m)$$

where X and Y are input signals and are discussed in more detail below. W(n, k) (the "twiddle factor") is a complex value and is given by the formula:

$$W(n,k) = e^{j\frac{2\pi nk}{N}}.$$

This complex function is periodic and for an FFT of a given size N, provides N/2 constant values. As discussed in more detail below, these values may be pre-calculated and stored in a memory.

FIG. 1 illustrates a traditional decimation in time FFT signal flow graph for an 8 input (8 point) FFT. An FFT algorithm will include $\log_2 N$ stages of calculations. Thus, the 8 point FFT signal flow graph 100 is divided into $\log_2 8$, or three, stages: the first stage 102, second stage 104 and the third stage 106, where each stage performs N/2 butterfly calculations. Thus, in FIG. 1, every stage of the signal flow graph 100 will calculate 8/2, or 4 butterfly calculations per stage. An examination of FIG. 1 also shows that the first stage provides four 2 point FFTs, the second stage provides two 4-point FFT's and the final stage provides one 8-point FFT. Thus, each stage will have a number of groups in which the FFTs are calculated. The number of groups per stage is given by:

$$\text{groups}=2^{Log_2(N)-m}$$

where N is the number of input data points, and m is the number of the stage and is from m=1 to m=$\log_2 N$. Thus in FIG. 1, the first stage has $2^{3-1}$ or 4 groups of FFTs, 108, 110, 112, and 114. The second stage has $2^{3-2}$ or 2 groups of FFTs, 116, and 118. The final stage has $2^{3-3}$ or 1 group of an FFT 120.

To compute an FFT on a computer, the signal flow graph 100 must be translated into a software program. A software program based on the traditional FFT signal flow graph will first typically re-order the data into a bit-reversed order as shown by the input data 122. Next, three loops that calculate FFT data are executed. The outermost loop, known as the stage loop, will be executed only for each stage. Therefore, for an N point FFT, there will be $\log_2 N$ outer loops that must be executed. The middle loop, known as the group loop, will be executed a different number of times for each stage. As discussed above, the number of groups per stage will vary from $2^{\log_2(N)-m}$ to 1 depending on the position of the stage in the algorithm. Thus for the early stages of the FFT the group loop will be entered into and out of many times in each stage. The inner most loop, known as the butterfly loop, will be executed N/2 times for each stage.

The FFT signal flow graph 100 also illustrates another aspect of the traditional FFT technique. The data that is provided by each butterfly calculator is stored in a different sequence in each stage of the FFT. For example, in the first stage 102 the input data is stored in a bit-reversed order. Thus, each butterfly calculator receives input data values that are stored in adjacent memory locations. In addition, each butterfly calculator provides output data values that are stored in adjacent memory locations in the sequence in which they are calculated. In the second stage 104 each butterfly calculation receives input data that is separated by 2 storage locations, and the output data values are stored in memory locations that are also 2 storage locations apart. In the third stage 106, each butterfly calculation receives data that is 4 storage locations apart and provides output data values that are also stored 4 storage locations apart. Thus, the distance between the storage locations where the output data values are stored (the stride) varies as a power of two from $2^0$ to $2^{N/2}$. Thus, in the illustrative embodiment the stride varies between 1 and 4 as discussed above.

In a typical computing system, the most time consuming operations are the reading and writing of data to and from memory respectively. Since the FFT is a very data intensive algorithm, many schemes have been developed to optimize the memory-addressing problem. Typically memory systems have been designed to increase the performance of the FFT by changing the pattern of how the memory is stored, by using smaller faster memories for the data, or by dedicating specific hardware to calculate the desired memory locations. However, the very nature of the traditional FFT as shown in FIG. 1 illustrates the limitations of these approaches. For each stage, a new stride will have to be computed and, for each stage, there are only so many ways to change the pattern of the memory storage. Modern computer languages also allow the accessing of memory locations directly using "pointers". Pointer arithmetic can be time consuming as well and the need to recalculate the pointer arithmetic for each stage is inefficient.

In addition to the data storage problem, traditionally, the control and overhead processing for a computer program takes up the bulk of the program memory, but only a small fraction of the actual processing time. Therefore, minimizing the control and overhead portions of a computer program is one method to further optimize the memory usage of the program. As discussed above, in the signal flow graph 100 the number of the stage loops and the butterfly loops to be executed are set by the system parameters, in particular the number of input data points used. The number of group loops to be executed however changes with each stage. In particular, in the early stages of the algorithm, the overhead and control software will be executing a large number of group loops each having a small number of butterfly loops for each stage. This entering and exiting of the group loops will result in a complex iteration space in which a large number of overhead and control instructions need to be executed, resulting in an inefficient program execution.

It would therefore be desirable to be able to compute an FFT in a manner that reduces the number of required iterations and simplifies the calculation of the storage locations of the output data values from each stage in memory.

BRIEF SUMMARY OF THE INVENTION

The present invention provides a method and apparatus for computing a FFT in which a unity stride is used to store the ouput data from each stage, and each stage of the FFT does not include a group loop calculation stage.

A method for computing an FFT is disclosed in which a sequence of first data points is received and stored in a first memory area. An FFT butterfly calculator selects R input data from the sequence of first data points where the input data are separated by N/R data points. The FFT butterfly calculator also receives the appropriate twiddle factors that are stored in sequential locations in a bit reversed order in a second memory area. The FFT butterfly calculator calculates a radix R butterfly calculation and stores the output data values in a third memory in the sequence in which they are calculated.

BRIEF DESCRIPTION OF THE SEVERAL VIEWS OF THE DRAWING

The invention will be more fully understood from the following detailed description taken in conjunction with the accompanying drawings in which:

FIG. 7 is a table illustrating the storing of twiddle factors in bit reversed order.

DETAILED DESCRIPTION OF THE DRAWINGS

Figure 2:
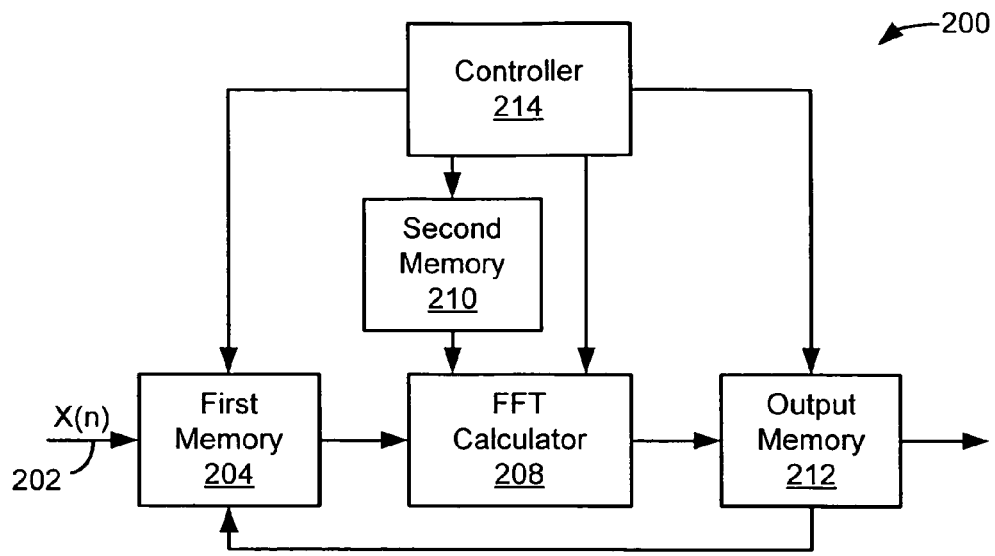
FIG. 2 is a block diagram illustrating an illustrative embodiment of the present invention.

A method consistent with the present invention for calculating a fast Fourier transform (FFT) more efficiently than in traditional methods is disclosed. FIG. 2 depicts a block diagram of a system operative in a manner consistent with the present invention. Input data values 202 are received and written into a first memory area 204. As will be explained in detail below, unlike traditional FFT methods, no re-ordering of the input data values 202 occurs. The FFT calculator stage 208 retrieves the input data values 202 needed for the calculation and also retrieves the twiddle factor values stored in bit-reverse order in a second memory, area 210. FFT calculation stage 208 calculates output data values 206. These output data values are stored sequentially in a third memory area 212, in the order in which they are calculated. As will be explained in detail below, this ordering and storing of the output data values in the order of calculation provides for unity stride memory operations for the output data values.

A loop controller 214 provides the overhead and process control functions for the algorithm. The loop controller 214 monitors which stage is currently executing, and determines which data are required. If more stages still need to be executed, the output data values 210 stored in the third memory area 212 is used as the input data values 202 for the next stage. If are no more stages to be executed, then the output data values 212 represents the discrete frequency components of the original band-limited analog data.

Figure 3:
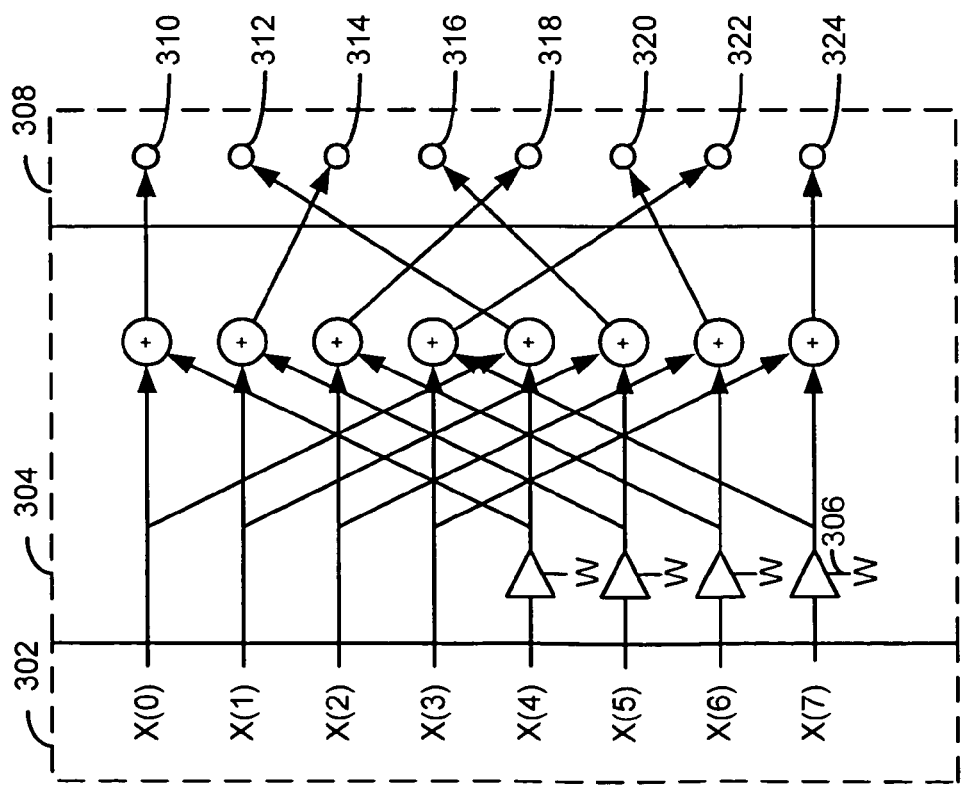
FIG. 3 is a signal flow diagram illustrating the signal flow diagram of an exemplary FFT calculation stage of the present invention.

FIG. 3 illustrates one embodiment of a signal flow diagram of an FFT calculator stage 300 consistent with the presently disclosed FFT method. The signal flow diagram illustrating the FFT calculator stage 300 will be identical for any stage of the presently disclosed FFT method. Thus, every stage of the FFT method consistent with the presently disclosed FFT method will have a signal flow diagram geometry that is the same as every other stage.

Figure 1:
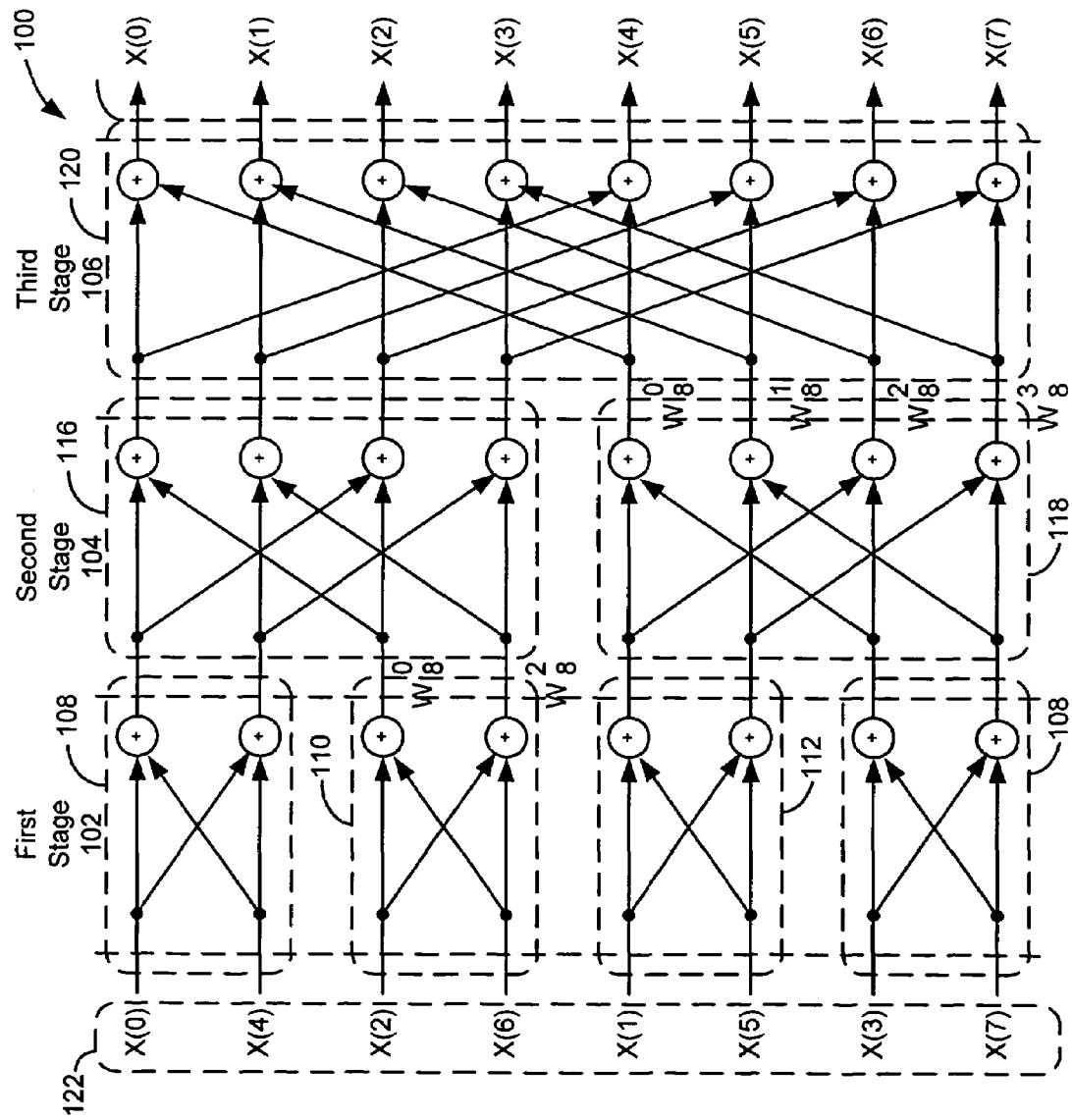
FIG. 1 is a schematic illustration of a signal flow diagram of a traditional FFT.

In the signal flow graph, input data values 302 are provided to the FFT calculator stage 300. The input data 302 is stored sequentially in the time-order in which each sample is taken. Thus, the input data values 302 represent the sampled and digitized band-limited analog signal in the sequential order in which they were sampled. This is in contrast to the bit-reversed storage required for the traditional FFT algorithm illustrated in FIG. 1. Storing the data sequentially results in a more efficient FFT algorithm because simpler calculations for the memory operations are required for each stage. As discussed above, the fewer memory operations a computer program executes, the more efficient it will be.

The number of input and output data values the FFT butterfly calculator has determines the radix of an FFT. Therefore for the embodiment illustrated in FIG. 3, each FFT butterfly calculator in the FFT calculator stage 300 has two inputs and is a radix 2 FFT. An FFT method that has 4 inputs for each FFT butterfly calculator is a radix 4 FFT. Although the illustrative embodiment described herein is for a radix 2 FFT, it would obvious to modify the presently disclosed FFT method for an FFT having radixes other than 2 and for a FFT having a mixed-radix as well.

Each of the FFT butterfly calculators in the FFT calculator stage 300 shown in FIG. 3 requires, as input, two data input values and one twiddle factor value and provides, as output, two output data values. In each stage of the presently disclosed FFT method the input data values for any FFT butterfly calculator are N/R data points apart. Where N is the number of input data points and R is the radix of the FFT. In the embodiment illustrated in FIG. 3, which is an 8-point radix-2 FFT, the two input data values will be N/2, or 4, data points apart.

Output stage 308 illustrates the storage of the output data values in the order in which it is calculated. The first butterfly calculator uses the input data x(0) and x(4). The output data values from this FFT butterfly are stored in the first and second memory locations 310, 312. The second butterfly calculator uses the input data x(1) and x(5). The output data values from this FFT butterfly are stored in the third and fourth memory locations 314, 316. The third butterfly calculator uses the input data x(2) and x(6). The output data values from this FFT butterfly are stored in the fifth and sixth memory locations 318, 320. The fourth butterfly calculator uses the input data x(3) and x(7). The output data values from this FFT butterfly are stored in the seventh and eighth memory locations 322, 324. Thus, the output data values are "re-ordered" according to the calculation order, unlike the traditional FFT algorithm illustrated in FIG. 1.

The re-ordering of the output data values, such that they are written into memory with a unity stride, helps to increase the efficiency of the presently disclosed FFT method. The unity stride reduces the number of calculations needed for the memory operations and, in addition, simplifies the arithmetic when using pointers or other memory accessing functions.

Figure 4:
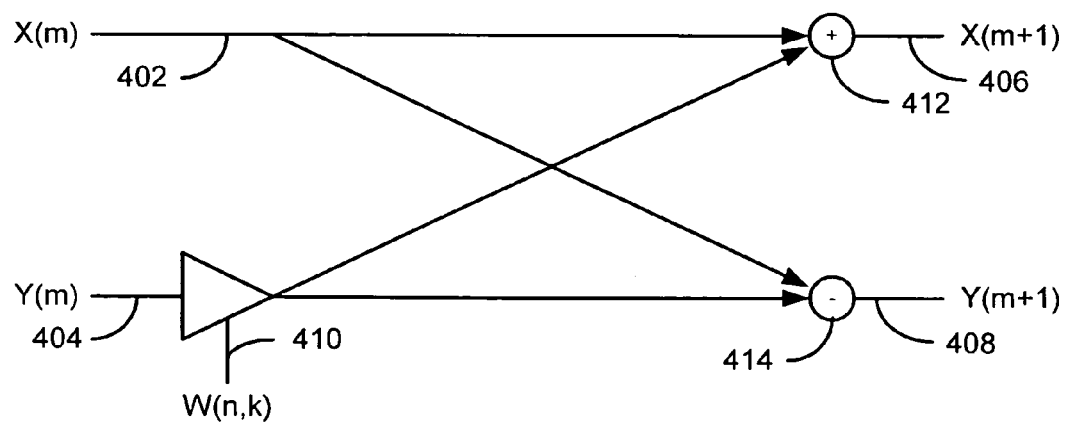
FIG. 4 is a signal flow diagram illustrating an FFT butterfly calculator.

FIG. 4 illustrates a suitable radix 2 FFT butterfly calculator 400 consistent with the presently disclosed FFT method. Input data Y(m) 402 and X(m) 404 are mathematically manipulated and combined to provide output data values 406 and 408. Input data Y(k) 404 is multiplied, by multiplier 409, with $W_N^{nk}$ 410. $W_N^{nk}$ is one of a predetermined number of "twiddle factor" constants that are used throughout the FFT method. Thus, for each stage in an FFT, there will be N/2 twiddle factors required. However, as will be explained below, there will not in general be N unique twiddle factors per stage.

In general, the twiddle factors are complex numbers having real and imaginary parts. The resultant product, which in general is also complex, is added, by adder 412, to input data X(m) 402 to form the output data value 406, and subtracted, by adder 414, from X(m) to form the output data value 408. Thus, in general, the arithmetic of the butterfly calculator is complex and requires complex additions and multiplications.

Figure 5:
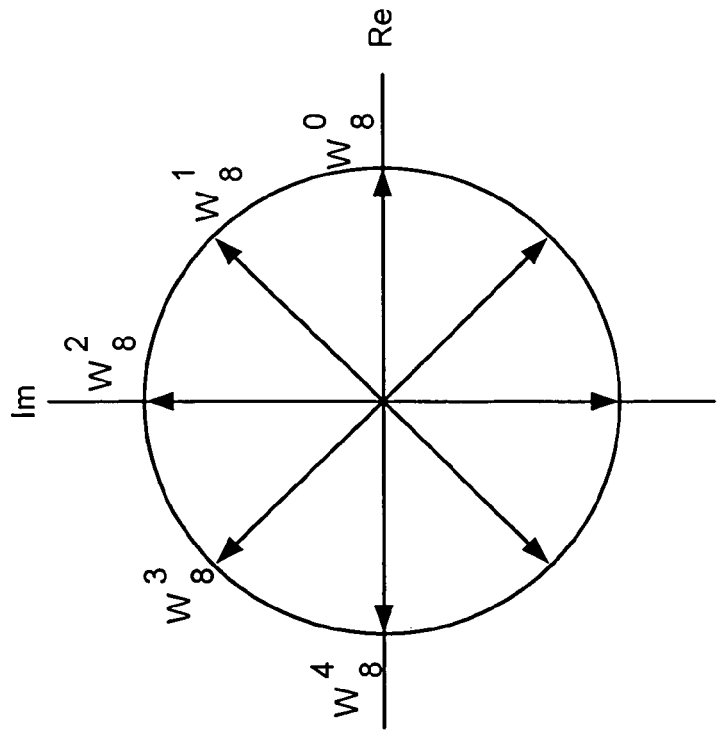
FIG. 5 is a graphical illustration of the twiddle factors for an 8 point FFT.

The twiddle factor data is required for every stage of the FFT method. As shown in FIG. 5, the twiddle factor values can be illustrated as points that are equidistantly and symmetrically spaced apart on the circumference of the unit circle in the imaginary plane. Thus, each twiddle factor represents a magnitude and a phase since it has both real and imaginary parts. In the presently disclosed FFT method, the number of twiddle factor values is equal to one-half the number of input data values for each FFT butterfly calculator. Thus, FIG. 5 represents the twiddle factors for an 8 point FFT. However, as is illustrated in FIG. 5, the twiddle factors are symmetric with respect to the origin. Thus, each twiddle factor will be the negative of the real and imaginary parts of another. In the illustrative embodiment, $W^0_9 = -W^4_8$; $W^1_9 = -W^5_8$; $W^2_9 = -W^6_8$; and $W^3_9 = -W^7_8$. Since each twiddle factor can be used for either of two values, the memory needed to store the twiddle factor values is decreased by a factor of 2.

Figure 6:
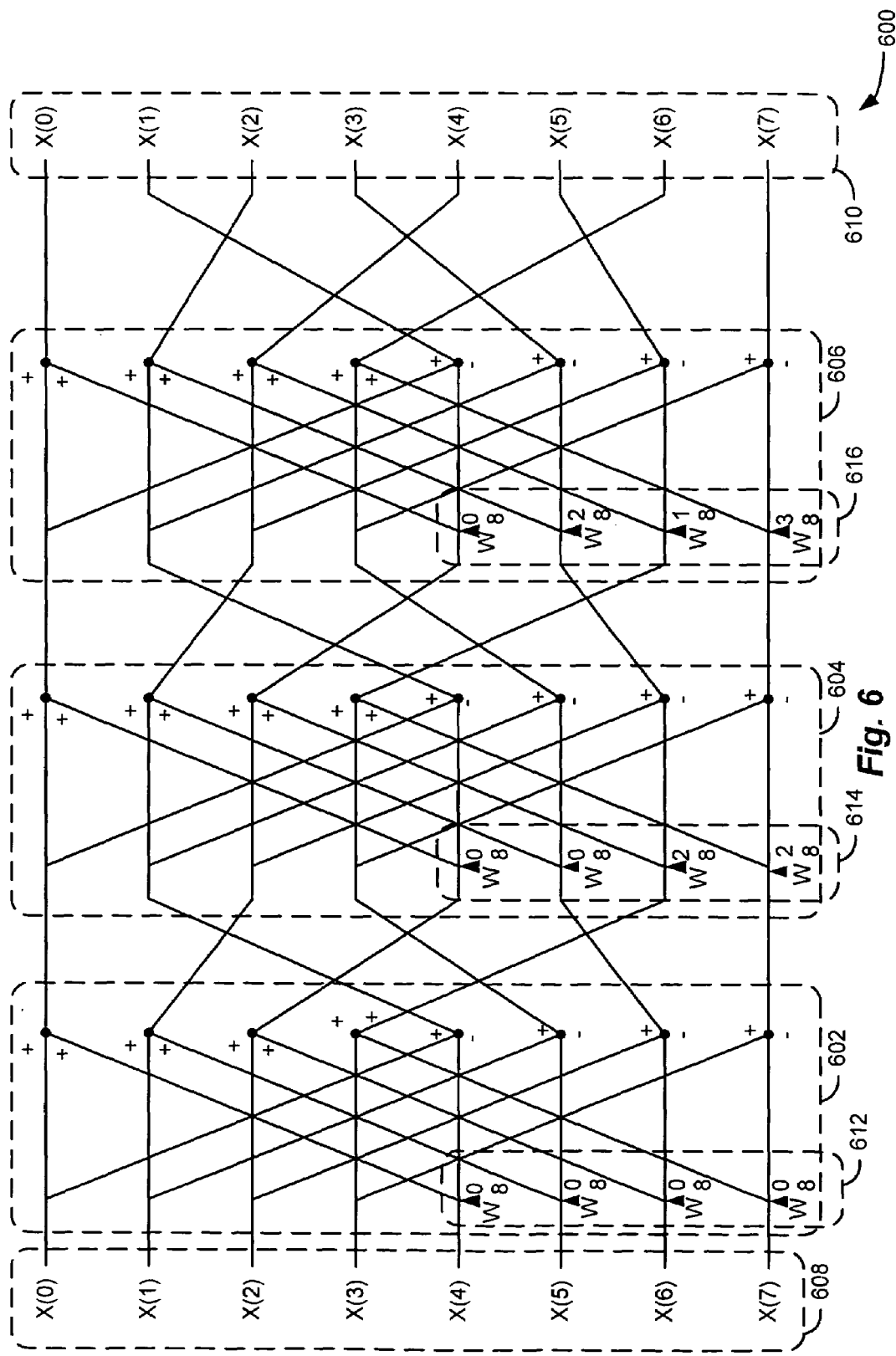
FIG. 6 is a signal flow diagram for an 8 point FFT consistent with the present invention.

FIG. 6 illustrates an 8-point radix-2 FFT signal flow diagram 600 according to the presently disclosed FFT method. The FFT signal flow diagram 600 includes 3 stages, 602, 604, 606, and each stage has four FFT butterfly calculators per stage. Thus, each stage has the presently disclosed FFT method has the identical geometry. In this way, the group loop and its associated overhead, have been eliminated. Thus, the disclosed technique eliminates the triple loop nesting structure of the traditional FFT method. As discussed above, the elimination of the control and overhead necessary for exiting and entering the group loop will concomitantly decrease the complexity of the memory address calculations needed to execute the program and thereby increases program efficiency. In addition in the presently disclosed FFT method, the input data 608 is not re-ordered, and the output data values for each stage are properly ordered by the use of the unity stride memory operations discussed above. Thus, the re-ordering that is necessary in the traditional FFT method is eliminated, along with, the additional memory read/write operations. The decrease in the complexity of the calculations needed for the memory read/write operations improves the efficiency of the operation of the presently disclosed method over the traditional FFT methods as well.

As shown in FIG. 6, the first stage 602 uses four twiddle factors 612 all of which equal $W^0_8$. The second stage 614 uses one pair of twiddle factors 614, $W^0_8$ and $W^2_8$, twice in a row in that order. The third stage 606 uses four twiddle factors $W^0_8$, $W^2_8$, $W^1_8$, and $W^3_8$ in that order.

Thus, the number of different twiddle factor values used per stage increases as a power of two and the twiddle factor values are retrieved from memory in a bit-reversed order. Therefore, in a preferred embodiment, the twiddle factors are stored in bit-reversed order to simplify the memory operations and increase efficiency. FIG. 8 is a schematic illustration of the bit reversal process used to store four twiddle factors for the presently disclosed FFT technique.

In one embodiment, the FFT method is programmed for execution in a general purpose computer using C, Java, or C++ or other suitable high level language. In another embodiment, the FFT method is programmed for use in a digital signal processing (DSP) system. In the DSP embodiment, the FFT method would use four pointer registers, and preferably the pointer register used to store the twiddle factors in bit reversed order is a circular address register. In addition, an out of place buffer placement of intermediate values is employed to eliminate instability within the inner, butterfly, loop.

As an example, for a 256-point radix-2 FFT, there will be 128 butterfly calculations in 8 stages. Assuming 3 cycles per butterfly, this will require a minimum of 128*8*2=3072 cycles. This number is not achievable however, because of the loop overhead and the overhead in the butterfly setup. Empirical tests have measured a traditional FFT method as using approximately 6600 cycles. The present FFT technique uses approximately 3330 cycles, i.e., nearly a 50% reduction in the number of cycles. Listed below is exemplary simulation code in the C programming language for one embodiment of the presently disclosed FFT method.

```
For (int s = 0; s < lgn; s++){              Stage Loop
    For (int k = 0; s < no2; k++){          Butterfly Loop
        R0 = *i0++; r1 = i1++; r3 = i3++;
        real(r4) = real(r1)*real(r3) – imag(r1)*imag(r3);
        imag(r4) = real(r1)*image(r3) + image(r1)*real(r3);
        real(r5) = real(r0) + real(r4);
        imag(r5) = imag(r0) + imag (r4)
        real(r6) = real(r0) – real(r4);
        imag(r6) = imag(r0) – imag(r4);
        *i2++ = r5;
        *i2++ = r6;
    }
    p0 <<= 1; 13.L = p0;                    Unity Power Update
    i1.B = i2.B; i2.B = i0.B; i0.B = i1.B   Exchange
}.
```

Where lgn is the $\log_2$ (N). Accordingly, there is no group loop and the twiddle factors are updated in the unity power update step.

Those of ordinary skill in the art will appreciate that variations to and modifications of the above-described FFT methods and apparatus may be made without departing from the inventive concept disclosed herein. Accordingly, the invention should be viewed as limited solely by the scope and spirit of the appended claims.

What is claimed is:

1. A method of computing a fast Fourier transform in a plurality of computation stages, the method comprising:
   (a) receiving N time-ordered first data values;
   (b) sequentially storing in a first memory each of said N time-ordered first data values in the time-order;
   (c) storing in a second memory a plurality of twiddle factors in a bit reversed order;
   (d) reading a predetermined number R of input butterfly data values of said N first data values, wherein said predetermined number R of input butterfly data values are separated by N/R first data values in said N time-ordered first data values;
   (e) performing a radix R butterfly calculation on said predetermined number R of input butterfly data values using at least one of the plurality of twiddle factors stored in the second memory to generate R output butterfly data values;
   (f) storing said R output butterfly data values in sequential memory locations of a third memory; and
   (g) performing said steps (c)–(f) N/R×2 times, wherein the predetermined number R is the same predetermined number each time the steps (d)–(f) are performed,
   wherein said reading step (d) includes reading the R output butterfly data values from said third memory,
   wherein the memory store operation performed in said storing step (f) has a unity stride, thereby allowing R output butterfly data values to be read from contiguous memory locations each time the R output butterfly data values are read from said third memory, and
   wherein said steps (a)–(g) are performed in each one of the plurality of computation stages.

2. The method as in claim 1 further comprising the steps of:
   replacing said N first data values in said first memory with selected ones of said R output butterfly data values stored in said third memory location;
   repeating steps (c)–(g) a total of $\log_r(n)$ times.

3. The method as in claim 1, wherein said predetermined number R equals 2.

4. The method as in claim 1, wherein said predetermined number R equals 4.

5. Apparatus for calculating a fast Fourier transform, the apparatus comprising:
   a plurality of computation stages, each computation stage comprising
   a first processor stage having an output including
      a first memory storing N time-ordered first data values, said N first data values being stored in said first memory sequentially in the time-order,
      a second memory storing a plurality of twiddle factor values, said plurality of twiddle factor values being stored in said second memory in a bit-reversed order,
      a third memory storing a plurality of output butterfly data values, and
      a fast Fourier transform calculator coupled to said first, second, and third memories, said fast Fourier transform calculator being operative
         to receive a predetermined number R of selected input butterfly data values of said N first data values, the predetermined number R of input butterfly data values being separated by N/R first data values,
         to receive at least one twiddle factor value from said second memory,
         to perform a radix R butterfly calculation to calculate R output butterfly data values using the at least one twiddle factor value,
         to write said R output butterfly data values into sequential memory locations of said third memory, and
         to perform said second receiving operation, said first performing operation, and said writing operation N/R×2 times, wherein the predetermined number R is the same predetermined number each time the second receiving, the first performing, and the writing operations are performed, and
   a second processor stage coupled to said output of said first processor stage,
   wherein calculations performed in said second processing stage include reading the R output butterfly data values from said third memory, and
   wherein the memory write operation performed by said fast Fourier transform calculator into the sequential memory locations of said third memory has a unity stride, thereby allowing R output butterfly data values to be read from contiguous memory each time the R output butterfly data values are read from said third memory.

6. The apparatus of claim 5 wherein the predetermined number R equals 2.

7. The apparatus of claim 5 wherein the predetermined number R equals 4.

8. Digital signal processing apparatus for performing a fast Fourier transform calculation, comprising:

a plurality of computation stages, each computation stage comprising a first processor stage having an output and including
a digital signal processor operative
to receive N time-ordered first data values,
to sequentially store in a first memory each of said N first data values in the time-order,
to store in a second memory a plurality of twiddle factors in a bit reversed order,
to read a predetermined number R of input butterfly data values of said N first data values, wherein said predetermined number R of input butterfly data values are separated by N/R data points in said N time-ordered first data values,
to perform a radix R butterfly calculation on said predetermined number R of input butterfly data values,
to provide R output butterfly data values using at least one of said plurality of twiddle factors,
to sequentially store said R output butterfly data values in sequential memory locations of a third memory, and
to perform said first storing operation, said reading operation, said first performing operation, said providing operation, and said second storing operation N/R x 2 times, wherein the predetermined number R is the same predetermined number each time the first storing, the reading, the first performing, the providing, and the second storing operations are performed, and a second processor stage having an input coupled to said output of said first processor stage, wherein calculations performed in said second processor stage include reading the R output butterfly data values from said third memory, and wherein the memory store operation performed by said digital signal processor in the sequential memory locations of said third memory has a unity stride, thereby allowing R output butterfly data values to be read from contiguous memory locations each time the R output butterfly data values are read from said third memory.

9. A method of computing a fast Fourier transform in a plurality of computation stages, the method comprising:

(a) receiving N time-ordered first data values;

(b) sequentially storing in a first memory each of said N time-ordered first data values in the time-order;

(c) storing in a second memory a plurality of twiddle factors in a bit reversed order;

(d) reading a predetermined number R of input butterfly data values of said N first data values, wherein said predetermined number R of input butterfly data values are separated by N/R first data values in said N time-ordered first data values;

(e) performing a radix R butterfly calculation on said predetermined number R of input butterfly data values using at least one of the plurality of twiddle factors stored in the second memory to generate R output butterfly data values;

(f) storing said R output butterfly data values in sequential memory locations of a third memory; and (g) performing said steps (C)–(f) N/R×2 times, wherein the predetermined number R is the same predetermined number each time the steps (d)–(f) are performed, wherein said reading step (d) includes reading the R output butterfly data values from said third memory, and wherein said steps (a)–(g) are performed in each one of the plurality of computation stages.

* * * * *

UNITED STATES PATENT AND TRADEMARK OFFICE
CERTIFICATE OF CORRECTION

PATENT NO. : 7,062,523 B1  
APPLICATION NO. : 09/630258  
DATED : June 13, 2006  
INVENTOR(S) : Marc Hoffman et al.

Page 1 of 1

It is certified that error appears in the above-identified patent and that said Letters Patent is hereby corrected as shown below:

Column 1, line 45, the formula " $X(k) = \frac{1}{N}\sum_{n=0}^{N-1} x(n)e^{j\frac{2\pi nk}{N}}$ " should read -- $X(k) = \frac{1}{N}\sum_{n=0}^{N-1} x(n)e^{j\frac{2\pi nk}{N}}$ --; and Column 2, line 20, the formula " $W(n,k) = e^{j\frac{2\pi nk}{N}}.$ " should read -- $W(n,k) = e^{j\frac{2\pi nk}{N}}.$ --.

Signed and Sealed this

First Day of September, 2009

David J. Kappos  
*Director of the United States Patent and Trademark Office*